(12) United States Patent
Hoffmann

(10) Patent No.: US 10,097,978 B2
(45) Date of Patent: Oct. 9, 2018

(54) TRANSMITTING MACHINE TYPE COMMUNICATION DATA BETWEEN A PLURALITY OF MACHINE TYPE COMMUNICATION DEVICES AND A MOBILE COMMUNICATION NETWORK

(71) Applicant: DEUTSCHE TELEKOM AG, Bonn (DE)

(72) Inventor: Johannes Hoffmann, Vienna (AT)

(73) Assignee: DEUTSCHE TELEKOM AG, Bonn (DE)

( * ) Notice: Subject to any disclaimer, the term of this patent is extended or adjusted under 35 U.S.C. 154(b) by 78 days.

(21) Appl. No.: 15/301,963

(22) PCT Filed: Mar. 23, 2015

(86) PCT No.: PCT/EP2015/056161
§ 371 (c)(1),
(2) Date: Oct. 5, 2016

(87) PCT Pub. No.: WO2015/154984
PCT Pub. Date: Oct. 15, 2015

(65) Prior Publication Data
US 2017/0118578 A1    Apr. 27, 2017

(30) Foreign Application Priority Data

Apr. 7, 2014    (EP) .................................... 14163717

(51) Int. Cl.
*H04W 4/70*    (2018.01)
*H04W 88/08*    (2009.01)
(Continued)

(52) U.S. Cl.
CPC .............. *H04W 4/70* (2018.02); *H04B 7/155* (2013.01); *H04W 52/0216* (2013.01);
(Continued)

(58) Field of Classification Search
CPC ..... H04W 4/005; H04W 4/00; H04W 72/042; H04W 72/1289; H04W 84/042;
(Continued)

(56) References Cited

U.S. PATENT DOCUMENTS

2012/0140760 A1    6/2012    Schmidt
2013/0315215 A1    11/2013    Beale
(Continued)

OTHER PUBLICATIONS

Lin Xingqin et al: "A novel approach to supporting legacy devices in LTE networks", 2013 IEEE Global Communications Conference (GLOBECOM), IEEE, Dec. 9, 2013 (Dec. 9, 2013), pp. 986-991, XP032604727.

*Primary Examiner* — Obaidul Huq
(74) *Attorney, Agent, or Firm* — Leydig, Voit & Mayer, Ltd.

(57) ABSTRACT

A method for transmitting machine type communication data between a plurality of machine type communication devices and a mobile communication network includes receiving, by the antenna equipment of the base station entity, radiofrequency electromagnetic signals transmitted by machine type communication devices. After reception of the radiofrequency electromagnetic signals by the base station entity, the machine type communication data are separated from mobile communication data and/or decoded separately from mobile communication data.

11 Claims, 2 Drawing Sheets

(51) Int. Cl.
    *H04W 52/02*     (2009.01)
    *H04B 7/155*     (2006.01)
    *H04W 72/12*     (2009.01)
    *H04W 72/04*     (2009.01)
    *H04L 5/00*     (2006.01)
    *H04W 84/04*     (2009.01)

(52) U.S. Cl.
    CPC ..... *H04W 52/0219* (2013.01); *H04W 72/042* (2013.01); *H04W 72/1289* (2013.01); *H04W 88/08* (2013.01); *H04L 5/003* (2013.01); *H04L 5/0048* (2013.01); *H04W 72/0453* (2013.01); *H04W 84/042* (2013.01); *Y02D 70/00* (2018.01); *Y02D 70/1224* (2018.01); *Y02D 70/1262* (2018.01); *Y02D 70/21* (2018.01)

(58) Field of Classification Search
    CPC ............... H04W 4/70; H04W 52/0216; H04W 52/0219; H04W 88/08; H04W 72/0453; H04B 7/155; Y02D 70/1224; Y02D 70/21; Y02D 70/00; Y02D 70/1262; H04L 5/003; H04L 5/0048
    USPC .................................................. 370/310, 315
    See application file for complete search history.

(56) References Cited

U.S. PATENT DOCUMENTS

| | | |
|---|---|---|
| 2014/0004895 A1 | 1/2014 | Song et al. |
| 2014/0071953 A1* | 3/2014 | Tian .................. H04W 72/0406 370/336 |
| 2015/0055469 A1* | 2/2015 | Lee ........................ H04L 47/127 370/235 |

\* cited by examiner

{ $ 0043 $ TEMP.SENSOR $ SIEMENS_0004711 $ -08.1 $ OK $ }

TRANSMITTING MACHINE TYPE COMMUNICATION DATA BETWEEN A PLURALITY OF MACHINE TYPE COMMUNICATION DEVICES AND A MOBILE COMMUNICATION NETWORK

CROSS-REFERENCE TO RELATED APPLICATIONS

This application is a U.S. National Phase application under 35 U.S.C. § 371 of International Application No. PCT/EP2015/056161, filed on Mar. 23, 2015, and claims benefit to European Patent Application No. EP 14163717.3, filed on Apr. 7, 2014. The International Application was published in English on Oct. 15, 2015 as WO 2015/154984 A1 under PCT Article 21(2).

FIELD

The present invention relates to a method for transmitting machine type communication data between, on the one hand, a plurality of machine type communication devices, and, on the other hand, a mobile communication network.

The present invention further relates to a system for transmitting machine type communication data between, on the one hand, a plurality of machine type communication devices, and, on the other hand, a mobile communication network.

The present invention further relates to a machine type communication device suitable for transmitting machine type communication data between the machine type communication device and a mobile communication network and to a mobile communication network suitable for transmitting machine type communication data between a plurality of machine type communication devices and the mobile communication network.

BACKGROUND

Machine type communication is increasingly used in cellular access networks, as well as in information and telecommunications systems in general. Examples of systems using machine type communication devices for machine type communication operations may include:

remotely controlled power meters as well as metering machine type communication devices,
   remotely controlled machine type communication devices for controlling functions e.g. in a home which make it possible to turn on an heating prior to arriving home.

In addition to such examples of stationary machine type communication, there are also applications of mobile machine type communication, such as remotely monitoring and/or controlling functions or status information in a car, boat, or some other kind of vehicle.

An important increase in signalling traffic and in data traffic in cellular access systems can be expected due to the vast amount of possible applications for machine type communication, machine type communication devices and machine type communication systems.

A machine type communication device may be connected through cellular access networks to mobile communication networks, the access networks may include GSM (Global System of Mobile Communication) access networks, GPRS (General Packet Radio System) access networks, and/or EPS/LTE (Evolved Packet System/Long Term Evolution) access networks. Typically, a machine type communication device will have relatively low mobility, low data consumption and infrequent communication. In addition, many, if not most, types of applications of machine type communication will be delay tolerant, i.e. they will not be real time applications, as opposed to traditional applications of cellular access networks, such as speech, streaming of data etc. In many cases, the application in which a machine type communication device is used needs the machine type communication device to report data, or it may happen that the machine type communication server needs to transmit data to the machine type communication device. This is typically realized via an Internet Protocol connection (IP connection) which necessitates a PDP context/IP bearer. A PDP (packet data protocol; e.g., IP, X.25, FrameRelay) context is a data structure which is typically present on both the serving GPRS support node (SGSN) and the gateway GPRS support node (GGSN). This data structure contains the session information when a session is active. When a machine type communication device wants to use GPRS, it needs first to attach and then activate a PDP context. This allocates a PDP context data structure in the serving GPRS support node that the machine type communication device is currently visiting and the serving GPRS support node that is serving the access point used by the machine type communication device.

Typically, a machine type communication device that, at a point in time, is not reachable via an Internet Protocol connection (IP connection), i.e. it has no PDP context/IP bearer or that it uses NAT (Network Address Translation) such that at least parts of the machine type communication device are not reachable, is typically triggered by a short message (SMS, Short Message System) to perform an action (such as starting a service within the machine type communication device) that ultimately establishes a connection to an Internet Protocol server.

However, the use of IP connections and/or short messages involves comparably high costs in term of signalling overhead and/or delay and/or requirements on the side of the machine type communication device, such as a process (in the machine type communication device) that is capable to react to incoming short messages and to parse their content. Moreover, in these cases protocol stacks are needed in the machine type communication device, which also may also lead to large signalling overhead and bandwidth consumption on the network side.

SUMMARY

In an embodiment, the present invention provides a method for transmitting machine type communication data between a plurality of machine type communication devices and a mobile communication network. The mobile communication network comprises an access network having at least a radio cell and a base station entity associated with the radio cell, the base station entity comprising an antenna equipment, wherein the antenna equipment is used for transmitting the machine type communication data. The mobile communication network provides mobile communication services—involving mobile communication data having bitrates of at least 9.6 kBd (9600 bits per second) and using the antenna equipment of the base station entity—to mobile subscribers of the mobile communication network. An air interface between the base station entity and the mobile subscribers comprises a plurality of frequency channels within at least one frequency band to provide the mobile communication services. The method comprises: receiving, by the antenna equipment of the base station entity, radiofrequency electromagnetic signals transmitted by the machine type communication devices. Via the radiofrequency electromagnetic signals the machine type communication data are transmitted at least towards the base station entity. The machine type communication data have a bitrate, in average per a time interval of at least 60 minutes, of at most 1 Bd (1 bit per second). The radiofrequency electromagnetic signals are overlapping—at least partially and in the frequency domain—with at least one frequency channel of the at least one frequency band to provide the mobile communication services of the mobile communication network. After the receiving of the radiofrequency electromagnetic signals by the antenna equipment of the base station entity, the machine type communication data are separated from the mobile communication data and/or decoded separately from the mobile communication data.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
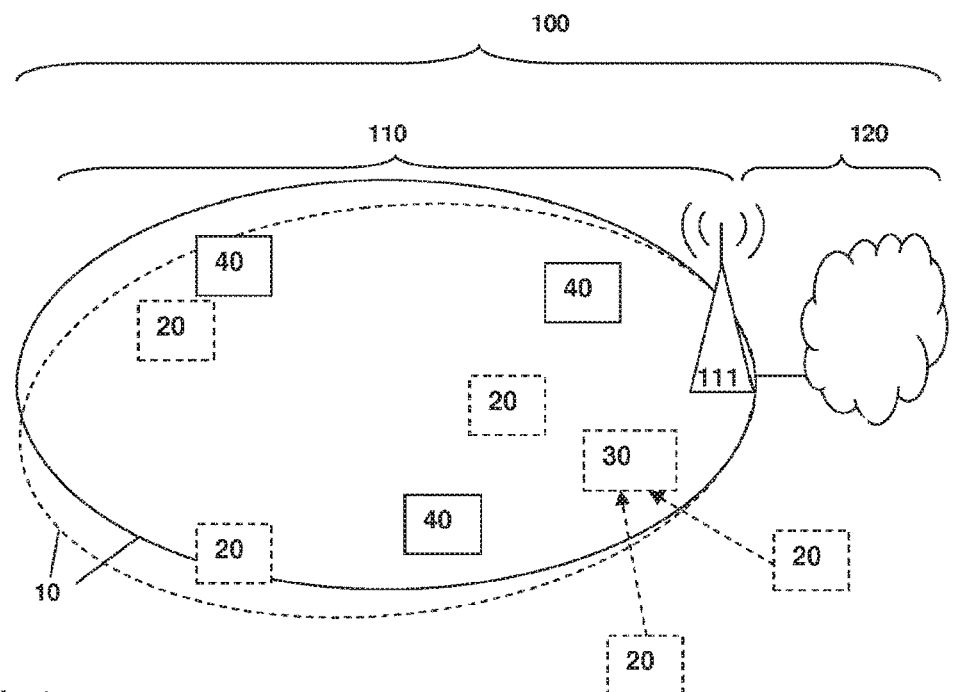
FIG. 1 schematically illustrates a system according to the present invention.

Embodiments of the present invention provide a method and system for transmitting machine type communication data between a plurality of machine type communication devices and a mobile communication network, a machine type communication device and a mobile communication network, wherein the machine type communication is enhanced, especially with respect to the additional network traffic caused by the transmission of machine type communication data within the mobile communication network.

In an embodiment, the present invention provides a method for transmitting machine type communication data between, on the one hand, a plurality of machine type communication devices, and, on the other hand, a mobile communication network, the mobile communication network comprising an access network having at least a radio cell and a base station entity associated with the radio cell, the base station entity comprising an antenna equipment, wherein the antenna equipment is used for transmitting the machine type communication data,
wherein the mobile communication network provides mobile communication services—involving mobile communication data having comparably high bitrates of at least 9.6 kBd (9600 bits per second) and using the antenna equipment of the base station entity—to mobile subscribers of the mobile communication network, wherein the air interface between the base station entity and the mobile subscribers comprises a plurality of frequency channels within at least one frequency band to provide the mobile communication services,
wherein the machine type communication devices transmit radiofrequency electromagnetic signals that are received by the antenna equipment of the base station entity, wherein via the radiofrequency electromagnetic signals the machine type communication data are transmitted at least towards the base station entity, wherein the machine type communication data have a comparably low bitrate, in average per a time interval of at least 60 minutes, of at most 1 Bd (1 bit per second), wherein the radiofrequency electromagnetic signals are overlapping—at least partially and in the frequency domain—with at least one frequency channel of the at least one frequency band to provide the mobile communication services of the mobile communication network,
wherein, after reception—using the antenna equipment—of the radiofrequency electromagnetic signals by the base station entity, the machine type communication data are separated from the mobile communication data and/or decoded separately from the mobile communication data.

According to the present invention, it is thereby advantageously possible to provide a method for transmitting machine type communication data between, on the one hand, a plurality of machine type communication devices, and, on the other hand, a mobile communication network, such that the additional network traffic caused by the transmission of machine type communication data within the mobile communication network is handled more efficiently. Preferably, the radiofrequency electromagnetic signals are overlapping—at least partially and in the frequency domain—with at least one frequency channel of the at least one frequency band to provide the mobile communication services of the mobile communication network such that a machine type communication—or machine-to-machine (M2M)—related overlay communication system is realized. Preferably, the machine type communication related network traffic is associated with comparably low bitrates—i.e. bitrates being several orders of magnitude lower than (higher) bitrates related to the transmission of mobile communication data (within the same frequency range). Preferably, the relatively low bitrates related to the transmission of machine type communication data enables the use of a plurality (e.g. thousands) of machine type communication devices within a single radio cell.

According to an embodiment of the present invention, the radiofrequency electromagnetic signals are preferably configured to transmit the machine type communication data in the form of low power level signals that the base station entity receives as superposed low level pseudo random background noise, wherein the base transceiver station is preferably configured for separation of the mobile communication data from the machine type communication data of the radiofrequency electromagnetic signals by employing signal processing and/or decoding methods. Preferably, the mobile communication data are separated from the machine type communication data via an identification of signatures transmitted by the signal portion that could be seen (by a standard base station entity) as superposed pseudo random background noise signal. Preferably, a randomization scheme, e.g., orthogonal frequency-division multiplexing (OFDM) or code division multiple access (CDMA), is used for making the signals from the machine communication devices to appear as noise like as possible (from the viewpoint of the mobile core network) in order to minimize interference with the radio frequency signals transmitted between the mobile subscribers.

According to another embodiment of the present invention, the radiofrequency electromagnetic signals are preferably configured to transmit the machine type communication data in dedicated frequency ranges, wherein the base transceiver station is preferably configured for separation of the mobile communication data from the machine type communication data of the radiofrequency electromagnetic signals by employing signal processing and/or decoding methods. Preferably, the mobile communication data are separated from the machine type communication data via frequency splitting methods.

According to a preferred embodiment of the present invention, a first protocol stack is used or applied for processing the mobile communication data and a second protocol stack is used or applied for processing the machine type communication data, wherein the second protocol stack is less complex and/or comprises less components compared with the first protocol stack.

According to the present invention, it is thereby advantageously possible to reduce the complexity of, e.g. integrated circuits and/or other elements of, the machine type communication device, due to the application of a relatively simple second protocol stack for the machine type communication data. Preferably, a one-chip solution of the machine type communication device is realized.

According to a preferred embodiment of the present invention, the overlap of the radiofrequency electromagnetic signals with the at least one frequency channel used to provide the mobile communication services to the mobile subscribers is an overlap within a proprietary and/or licenced frequency band or frequency channel.

According to the present invention, it is thereby advantageously possible to use existing components of the mobile communication network (e.g. the antenna equipment etc.) to transmit the machine type communication data. In particular, the allocation of additional bandwidths or frequency spectra for the transmission of the machine type communication data may be omitted. Preferably, the machine type communication data is transmitted in such a way that a signal-to-noise-like ratio of signals transmitted via the air interface in the respective frequency band is reduced (i.e. from the point of view of the mobile communication network the noise is increased due to the additional network traffic caused by the transmission of machine type communication data). Preferably, transmission parameters related to the transmission of machine type communication data is adapted depending on a threshold value related to a selected quality of service (QoS).

According to a preferred embodiment of the present invention, the transmission of machine type communication data occurs unidirectional in the direction from the machine type communication devices towards the base station entity, or unidirectional in the direction from the machine type communication devices towards a further type of machine type communication device.

According to the present invention, it is thereby advantageously possible to reduce the power consumption and/or complexity of the machine type communication device. Preferably, the unidirectional transmission of the machine type communication data is provided for preconfigured machine type communication devices, e.g. sensors.

According to a preferred embodiment of the present invention, the transmission of machine type communication data occurs bidirectional in the direction from the machine type communication devices towards the base station entity, and in the direction from the base station entity towards the machine type communication devices such that the machine type communication data are transmitted:

towards the base station entity via the radiofrequency electromagnetic signals, and towards the machine type communication devices via further radiofrequency electromagnetic signals transmitted by the antenna equipment of the base station entity.

According to the present invention, it is thereby advantageously possible to provide support for interactive applications and dynamic control of the machine communication devices (e.g. via the mobile communication network or by the base station entity).

According to a preferred embodiment of the present invention, the transmission of the machine type communication data only occurs upon reception of a pilot signal transmitted by the base station entity, wherein the pilot signal especially contains a frequency and/or transmission schedule assignment for the machine type communication devices.

According to the present invention, it is thereby advantageously possible to assign the frequency and/or transmission schedule to the machine communication devices. Regarding the frequency assignment, it is preferred that the "correct" frequency (i.e. a frequency being used by the bases station entity on which the machine communication devices are camping) is assigned to the machine communication devices. Thereby it is advantageously possible to avoid a transmission of machine type communication data to another (i.e. "wrong") cell (for example another cell which is not configured for machine type communication services). It is especially preferred that the base station entity transmits a pilot signal such that the transmission of machine type communication data is enabled depending on the pilot signal. Preferably, a level of the pilot signal is adapted according to environmental conditions. Preferably, the machine type communication devices are configured for frequency tuning. It is furthermore preferred that different pilot signals (which comprise different control information such as frequency and/or transmission schedules) are used (e.g. for different kinds of machine type communication devices).

In an embodiment, the present invention provides a system for transmitting machine type communication data between, on the one hand, a plurality of machine type communication devices, and, on the other hand, a mobile communication network, the system comprising the mobile communication network and the plurality of machine type communication devices, the mobile communication network comprising an access network having at least a radio cell and a base station entity associated with the radio cell, the base station entity comprising an antenna equipment, wherein the antenna equipment is configured for transmitting the machine type communication data, wherein the mobile communication network is configured to provide mobile communication services—involving mobile communication data having comparably high bitrates of at least 9.6 kBd (9600 bits per second) and using the antenna equipment of the base station entity—to mobile subscribers of the mobile communication network, wherein the air interface between the base station entity and the mobile subscribers comprises a plurality of frequency channels within at least one frequency band to provide the mobile communication services, wherein the machine type communication devices are configured to transmit radiofrequency electromagnetic signals received by the antenna equipment of the base station entity, wherein the machine type communication devices are configured such that via the radiofrequency electromagnetic signals, the machine type communication data are transmitted at least towards the base station entity, wherein the machine type communication data have a comparably low bitrate, in average per a time interval of at least 60 minutes, of at most 1 Bd,
wherein the radiofrequency electromagnetic signals are overlapping—at least partially and in the frequency domain—with at least one frequency channel of the at least one frequency band to provide the mobile communication services of the mobile communication network,
wherein the base station entity is configured such that, after reception—using the antenna equipment—of the radiofrequency electromagnetic signals by the base station entity, the radiofrequency electromagnetic signals are separated from the mobile communication data and/or decoded separately from the mobile communication data.

According to the present invention, it is thereby advantageously possible to provide a system for transmitting machine type communication data between, on the one hand, a plurality of machine type communication devices, and, on the other hand, a mobile communication network, such that the additional network traffic caused by the transmission of machine type communication data within the mobile communication network is handled more efficiently by the system. Preferably, the system is configured to provide the mobile communication services of the mobile communication network such that a machine type communication—or machine-to-machine (M2M)—related overlay communication system is realized. Preferably, the machine type communication related network traffic is associated with comparably low bitrates—i.e. bitrates being at least one order of magnitude lower, preferably more than one order of magnitude lower, than (higher) bitrates related to the transmission of mobile communication data (within the same frequency range). Preferably, the relatively low bitrates related to the transmission of machine type communication data enables the use of a plurality (e.g. thousands) of machine type communication devices within a single radio cell.

According to a preferred embodiment of the present invention, the machine type communication devices and the base station entity are configured such that the transmission of machine type communication data occurs unidirectional in the direction from the machine type communication devices towards the base station entity.

According to the present invention, it is thereby advantageously possible to provide a system, wherein the power consumption and/or complexity of each machine type communication device of the plurality of machine type communication devices is reduced. Preferably, the unidirectional transmission of the machine type communication data is provided for preconfigured machine type communication devices, e.g. sensors.

According to a preferred embodiment of the present invention, the machine type communication devices and the base station entity are configured such that the transmission of machine type communication data occurs bidirectional in the direction from the machine type communication devices towards the base station entity, and in the direction from the base station entity towards the machine type communication devices such that the machine type communication data are transmitted:
towards the base station entity via the radiofrequency electromagnetic signals, and
towards the machine type communication devices via further radiofrequency electromagnetic signals transmitted by the antenna equipment of the base station entity.

According to the present invention, it is thereby advantageously possible to provide a system, wherein provision is made for interactive applications and dynamic control of the machine communication devices (e.g. via the mobile communication network or by the base station entity).

According to a preferred embodiment of the present invention, the base station entity comprises a splitter device between the antenna equipment and signal processing elements provided for the mobile communication data.

According to the present invention, it is thereby advantageously possible to provide machine type communication in a mobile communication network, wherein implementation expenditures are relatively low, especially with respect to network traffic and/or signaling overhead. In particular, additional network traffic related to the transmission of machine type communication data is handled more efficiently as compared to the state of the art. Preferably the separation (coupling out and/or decoding) of machine type communication data and mobile communication data is at least partially realized via the splitter depending on the radiofrequency electromagnetic signals that are received by the antenna equipment of the base station entity.

Moreover, relatively simple-built machine type communication devices may be employed.

In an embodiment, the present invention provides a machine type communication device suitable for transmitting machine type communication data between the machine type communication device and a mobile communication network in a system according to the present invention.

According to the present invention, it is thereby advantageously possible to provide a machine type communication device being configured to transmit machine type communication data without authentication of the machine type communication device to the mobile communication network and/or under conditions of severe power constraints. Preferably, a one-chip solution of the machine type communication device is realized. Moreover, a machine type communication device with relatively low power consumption and/or long lifetime (e.g. one year or more), especially with regard to a machine type communication device having built-in batteries.

In an embodiment, the present invention provides a mobile communication network suitable for transmitting machine type communication data between a plurality of machine type communication devices and the mobile communication network in a system according to the present invention.

According to the present invention, it is thereby advantageously possible to provide a mobile communication network, wherein additional network traffic caused by the transmission of machine type communication data within the mobile communication network is handled more efficiently. Preferably, the mobile communication services of the mobile communication network are provided such that a machine type communication—or machine-to-machine (M2M)—related overlay communication system is realized.

In an embodiment, the present invention provides a program comprising a computer readable program code which, when executed on a computer or on a machine type communication device or on a network component of a mobile communication network or in part on a machine type communication device and in part on a network component of a mobile communication network, causes the computer or the machine type communication device and/or the network component of the mobile communication network to perform a method according to the present invention.

In an embodiment, the present invention provides a computer program product for using a machine type communication device with a mobile communication network, the computer program product comprising a computer program stored on a storage medium, the computer program comprising program code which, when executed on a computer or on a machine type communication device or on a network component of a mobile communication network or in part on a machine type communication device and in part on a network component of a mobile communication network, causes the computer or the machine type communication device and/or the network component of the mobile communication network to perform a method according to the present invention.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a system for transmitting machine type communication data between, on the one hand, a plurality of machine type communication devices 20, and, on the other hand, a mobile communication network 100, especially a public land mobile network 100, is schematically shown. The mobile communication network 100 comprises an access network 110 and a core network 120. The mobile communication network 100 is preferably a cellular telecommunications network comprising typically a plurality of network radio cells, one of which is represented in FIG. 1 by means of a solid line and reference sign 10. In the mobile communication network 100, typically a plurality of mobile subscribers 40 are camping on the telecommunications network 100 within the network radio cell 10, i.e. the mobile subscribers 40 are connected or are camping on a base station entity 111 serving the radio cell 10. The base station entity 111 is typically a base station, e.g. a NodeB or an eNodeB base transceiver station. The mobile communication network 100 is configured to provide mobile communication services to the mobile subscribers 40 within the radio cell 10 of the mobile communication network 100. Preferably, mobile communication data (related to the mobile communication services) are transmitted between the mobile subscribers 40 and the mobile communication network via the base station entity 111, wherein the mobile communication data are transmitted with comparably high bitrates of at least 9.6 kBd (9600 bits per second). The air interface between the base station entity 111 and the mobile subscribers 40 comprises a plurality of frequency channels within at least one frequency band to provide the mobile communication services.

The core network 120 is only schematically shown by means of a cloud representation. The public land mobile network 100 (especially the core network 120) comprises typically various network elements such as an MSC (Mobile Switching Center), a SGSN (Serving GPRS Support Node), a MME (Mobility Management Entity), preferably a plurality of network element thereof.

According to the present invention, the plurality of machine type communication devices 20 are camping on the telecommunications network 100 within the network radio cell 10, i.e. the machine type communication devices are connected or are camping on the base station entity 111. The machine type communication devices 20 are configured to transmit radiofrequency electromagnetic signals which are received by the base station entity 111. The machine type communication devices 20 are configured such that via the radiofrequency electromagnetic signals, the machine type communication data are transmitted towards the base station entity 111. The machine type communication data are transmitted at a comparably low bitrate, in average per a time interval of at least 60 minutes, of at most 1 Bd (1 bit per second).

According to the present invention, the radiofrequency electromagnetic signals are overlapping—at least partially and in the frequency domain—with at least one frequency channel of the at least one frequency band to provide the mobile communication services of the mobile communication network 100. Preferably, a machine type communication—or machine-to-machine (M2M)—related overlay communication radio cell is realized (represented by the dashed line in FIG. 1), wherein the machine type communication related network traffic is associated with comparably low bitrates—i.e. bitrates being several orders of magnitude lower than the (higher) bitrates related to the transmission of mobile communication data (within the same frequency range).

A machine type communication device is schematically represented by means of reference sign 20. The machine type communication device 20 preferably comprises a mobile communication interface for communication with the mobile communication network 100 and/or a processing device comprising:
  a sensor or a plurality of sensors or
  an actuator or a plurality of actuators or
  a sensor and an actuator or a plurality of sensors and/or a plurality of actuators
  a microprocessor with interfaces to memory, the sensors/actuators and the mobile communication interface.

According to an embodiment of the present invention, the transmission of machine type communication data occurs unidirectional in the direction from the machine type communication devices 20 towards the base station entity 111. Alternatively, unidirectional in the direction from the machine type communication devices 20 towards a further type of machine type communication device 30.

According to one example, the machine type communication devices 20 are configured as temperature sensors embedded in the pavement of freeways and on bridges to provide real-time machine type communication data for traffic monitoring and warning systems at a comparably low bitrate of correspondingly few bytes every few minutes.

According to one example, the machine type communication devices 20 are configured as miniature sensors with limited lifetime (i.e. of battery life) of a few months for agricultural use by providing measurements of humidity or fertilizer concentration, wherein users (e.g. farmers) may access machine type communication data stored on centralized servers. Preferably, several devices per hectare are used, wherein correspondingly few bytes are transmitted per day.

According to one example, the machine type communication devices 20 are configured as avalanche warning sensors, deployed e.g. by dropping from helicopters, wherein the machine type communication devices 20 are associated with identifiers being tagged to geo-localization data and/or are equipped with acceleration sensors. Preferably, the machine type communication data are hourly measurement data of snow conditions of a few bytes. Additionally, such machine type communication devices 20 could also be configured to transmit measurement data triggered by an acceleration event (especially a comparably high acceleration value), transmitted using a higher bitrate.

According to one example, the machine type communication devices 20 are configured for hobby applications, i.e. all kinds of sensors and measurement devices built into model helicopters, for gardening use, entertainment, home applications.

According to one example, the machine type communication devices 20 are configured for communication with a local access point as base station entity/receiver station, e.g. a home router or handheld devices like specially equipped smart phones.

According to one example, the machine type communication devices 20 are configured for applications like key finder (e.g. in an embedded one-chip realization of the machine type communication device 20), pet tracker.

Figure 2:
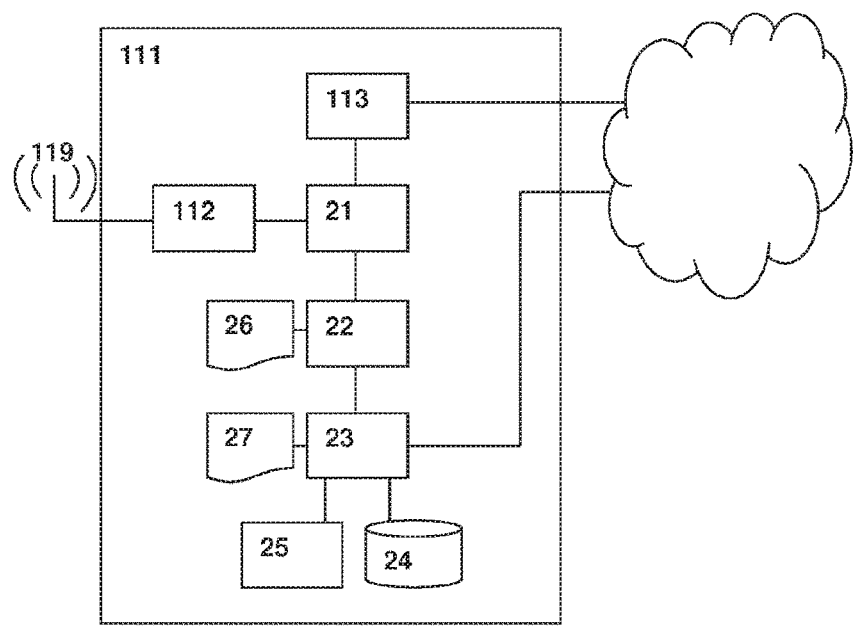
FIG. 2 schematically illustrates a base station entity according to the present invention.

In FIG. 2, a base station entity 111 according to the present invention is schematically illustrated. The base station entity 111 comprises antenna equipment 119 for receiving radio frequency signals associated with the mobile subscribers 40 and the machine type communication devices 20. The base station entity 111 comprises an antenna equipment 119 for generation of a data signal upon reception of the radio frequency signals such that the data signal carries the mobile communication data and the machine type communication data (e.g. in the form of additional low energy contributions from the machine type communication devices 20 as an "overlay system"). The base station entity 111 is configured such that, after reception of the radiofrequency electromagnetic signals by the base station entity 111, the machine type communication data are separated from the mobile communication data and/or decoded separately from the mobile communication data.

The base station entity 111 comprises amplifier 112 for amplification of the data signal. A splitter device 21 is connected to the amplifier 112, wherein the splitter device 21 is configured for separation of the data signal into a first partial signal and a second partial signal. The first partial signal is transmitted to processing elements 113 of the base station entity 111, wherein the processing elements 113 are configured for processing the first partial signal received from the splitter device 21, wherein the mobile communication data are provided from the processing elements 113 to the core network 120. The base station entity 111 further separates the machine type communication data from the mobile communication data and/or decodes the machine type communication data separately from the mobile communication data. The second partial signal of the data signal comprising the machine type communication data is further processed, e.g. according to the respective application examples described above.

It is preferred according to the present invention that the splitter device 21 is configured to copy the data signal such that the first and second partial signals are each copies of the data signal and/or configured to separate the first and second partial signals via electronic frequency filters.

Preferably, the machine type communication data are transmitted to the base station entity 111 without using a subscriber identity module (SIM). This means, in particular, that "SIM-less provisioning" is realized by the system. In this scenario, a machine type communication device 20 comprises an identifier (device-ID) for identification of the machine type communication device 20. For example, the device-ID is a serial number associated with the machine type communication device 20, especially a unique serial number. Preferably, the machine type communication device 20 is configured for generation (e.g. via a firmware) and transmission of a signature signal, wherein the signature signal is preferably a superposed signal of the radio frequency signal transmitted between the machine type communication device 20 and the base station entity 111. For example, the signature signal is a waveform signal or associated with a time slot. Preferably, a reference identifier related to a link or unique relationship between the device-ID and the signature signal is stored in the machine communication device and/or in a signature device 26 of the base station entity 111. Preferably, the reference identifier is transmitted from the machine type communication device 20 to the base station entity 111 upon initial deployment of the machine type communication device 20. The base station entity 111 further decodes the machine type communication data via signal detection methods based on the known (i.e. expected) signature signal. For example, convolutional decoding methods are executed by a detection and/or decoding unit 22 in order to separate the machine type communication data from the mobile communication data. Preferably, the signature signal comprises a (comparably regular or exact) repetition of short pulses such that a background signal associated with the machine type communication data is detected separately from a foreground signal associated with the mobile communication data in the same frequency band. Preferably, the signature signal is configured as a time invariant signal.

The base station entity 111 further routes traffic related to machine type communication data according to a routing table stored in an element 27 of the base station entity 111. The machine type communication data are provided to local applications 25, a local storage 24 and/or a remote destination within the mobile communication network 100.

According to the present invention, the base station entity 111 comprises a software defined radio system, which is deployed, e.g., in the base station entity or in an ITS (intelligent transportation system) roadside unit. Preferably, the software defined radio system is a radio communication system where components that have been typically implemented in hardware (e.g. mixers, filters, amplifiers, modulators/demodulators, detectors, etc.) are instead implemented via software on a personal computer or embedded system.

The skilled person understands that the reception and decoding functionalities for specific signal signatures may preferably be implemented in a handheld device (e.g. smart phone) or a dedicated unit (e.g. for an agricultural application, controlling watering or fertilizing), wherein preferably no intermediate system or network is needed in the cases of unidirectional communication from sensors to the base station entity.

Figures 3, 4:
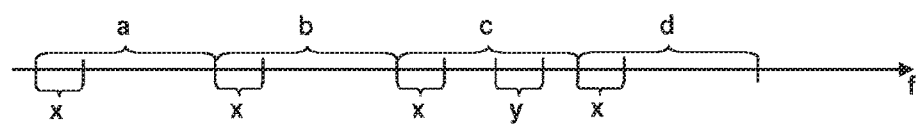
FIG. 3 schematically illustrates an example for spectrum allocation for the transmission of machine type communication data.
FIG. 4 schematically illustrates an example of a simplified protocol for the transmission of machine type communication data.

In FIG. 3, an example of a spectrum allocation for transmission of mobile communication data and/or machine type communication via radio frequency signals is shown, wherein here the frequency domain (represented by the reference symbol f) is shown. FIG. 3 shows a first frequency band, a, a second frequency band, b, a third frequency band, c, and a fourth frequency band, d, which are, in particular, owned by the network operator. Each frequency band a, b, c, d is preferably associated with another base station entity 111. Furthermore, each frequency band a, b, c, d comprises a sub-range, x, being reserved for a particular machine type communication application (e.g. network wide). Furthermore, a further sub-range, y, is shown, which is reserved for a dedicated machine type communication application in the radio cell 10 of the base station entity 111, here (only) in frequency band c.

In FIG. 4, an example for a simplified protocol is shown. According to the present invention, a first protocol stack is used or applied for processing the mobile communication data and a second protocol stack is used or applied for processing the machine type communication data, wherein the second protocol stack is less complex and/or comprises less components compared with the first protocol stack. FIG. 4 shows one example of the second protocol stack comprising five sections (in the example of FIG. 4 separated by $ signs). A first section relates to a length of a message, wherein the first section indicates here a length of 43 characters. A second section relates to a device type or application type, wherein the second section indicates here that the machine type communication device is a temperature sensor. A third section relates to a device identifier (device-ID) or serial number. A fourth section comprises data, here a temperature value. A fifth section comprises a checksum value.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a," "an" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for transmitting machine type communication data between a plurality of machine type communication devices and a mobile communication network, the mobile communication network comprising an access network having at least a radio cell and a base station entity associated with the radio cell, the base station entity comprising an antenna equipment, wherein the antenna equipment is used for transmitting the machine type communication data, wherein the mobile communication network provides mobile communication services—involving mobile communication data having bitrates of at least 9.6 kBd (9600 bits per second) and using the antenna equipment of the base station entity—to mobile subscribers of the mobile communication network, wherein an air interface between the base station entity and the mobile subscribers comprises a plurality of frequency channels within at least one frequency band to provide the mobile communication services, the method comprising:

receiving, by the antenna equipment of the base station entity, radiofrequency electromagnetic signals transmitted by the machine type communication devices;

wherein via the radiofrequency electromagnetic signals the machine type communication data are transmitted at least towards the base station entity, wherein the machine type communication data have a bitrate, on average per a time interval of at least 60 minutes, of at most 1 Bd (1 bit per second);

wherein the radiofrequency electromagnetic signals overlap—at least partially and in the frequency domain—with at least one frequency channel of the at least one frequency band;

wherein, after the receiving of the radiofrequency electromagnetic signals by the antenna equipment of the base station entity, the machine type communication data are separated from the mobile communication data and/or decoded separately from the mobile communication data.

2. The method according to claim 1, wherein a first protocol stack is used or applied for processing the mobile communication data and a second protocol stack is used or applied for processing the machine type communication data, wherein the second protocol stack is less complex and/or comprises less components compared with the first protocol stack.

3. The method according to claim 1, wherein the overlap of the radiofrequency electromagnetic signals with the at least one frequency channel is an overlap within a proprietary and/or licensed frequency band or frequency channel.

4. The method according to claim 1, wherein the transmission of machine type communication data is
unidirectional in a direction from the machine type communication devices towards the base station entity, or
unidirectional in a direction from the machine type communication devices towards a further type of machine type communication device.

5. The method according to claim 1, wherein the transmission of machine type communication data is bidirectional, including a direction from the machine type communication devices towards the base station entity and a direction from the base station entity towards the machine type communication devices.

6. The method according to claim 1, wherein the transmission of the machine type communication data occurs in response to reception of a pilot signal transmitted by the base station entity, wherein the pilot signal comprises a frequency and/or transmission schedule assignment for the machine type communication devices.

7. A system for transmitting machine type communication data between a plurality of machine type communication devices and a mobile communication network, the system comprising:
the mobile communication network; and
the plurality of machine type communication devices;
wherein the mobile communication network further comprises an access network having at least a radio cell and a base station entity associated with the radio cell, the base station entity comprising an antenna equipment, wherein the antenna equipment is configured for transmitting the machine type communication data;
wherein the mobile communication network is configured to provide mobile communication services—involving mobile communication data having bitrates of at least 9.6 kBd (9600 bits per second) and using the antenna equipment of the base station entity—to mobile subscribers of the mobile communication network, wherein an air interface between the base station entity and the mobile subscribers comprises a plurality of frequency channels within at least one frequency band to provide the mobile communication services;
wherein the machine type communication devices are configured to transmit radiofrequency electromagnetic signals to the antenna equipment of the base station entity, wherein via the radiofrequency electromagnetic signals, the machine type communication data are transmitted at least towards the base station entity, wherein the machine type communication data have a bitrate, on average per a time interval of at least 60 minutes, of at most 1 Bd (1 bit per second);
wherein the radiofrequency electromagnetic signals overlap—at least partially and in the frequency domain—with at least one frequency channel of the at least one frequency band;
wherein the base station entity is configured such that, after reception of the radiofrequency electromagnetic signals by the base station entity, machine type communication data are separated from the mobile communication data and/or decoded separately from the mobile communication data.

8. The system according to claim 7, wherein the machine type communication devices and the base station entity are configured such that the transmission of machine type communication data is unidirectional in the direction from machine type communication devices towards the base station entity.

9. The system according to claim 7, wherein the machine type communication devices and the base station entity are configured such that the transmission of machine type communication data is bidirectional, including a direction from the machine type communication devices towards the base station entity and a direction from the base station entity towards the machine type communication devices.

10. The system according to claim 7, wherein the base station entity comprises a splitter device between the antenna equipment and signal processing elements provided for the mobile communication data.

11. A non-transitory, computer-readable medium having processor-executable instructions stored thereon, the processor-executable instructions, when executed, facilitating performance of a method for transmitting machine type communication data between a plurality of machine type communication devices and a mobile communication network, the mobile communication network comprising an access network having at least a radio cell and a base station entity associated with the radio cell, the base station entity comprising an antenna equipment, wherein the antenna equipment is used for transmitting the machine type communication data, wherein the mobile communication network provides mobile communication services—involving mobile communication data having bitrates of at least 9.6 kBd (9600 bits per second) and using the antenna equipment of the base station entity—to mobile subscribers of the mobile communication network, wherein an air interface between the base station entity and the mobile subscribers comprises a plurality of frequency channels within at least one frequency band to provide the mobile communication services, the method comprising:
receiving, by the antenna equipment of the base station entity, radiofrequency electromagnetic signals transmitted by the machine type communication devices;
wherein via the radiofrequency electromagnetic signals the machine type communication data are transmitted at least towards the base station entity, wherein the machine type communication data have a bitrate, on average per a time interval of at least 60 minutes, of at most 1 Bd (1 bit per second);
wherein the radiofrequency electromagnetic signals overlap—at least partially and in the frequency domain—with at least one frequency channel of the at least one frequency band;
wherein, after the receiving of the radiofrequency electromagnetic signals by the antenna equipment of the base station entity, the machine type communication data are separated from the mobile communication data and/or decoded separately from the mobile communication data.

* * * * *